(12) United States Patent
Pevler et al.

(10) Patent No.: US 7,948,426 B2
(45) Date of Patent: May 24, 2011

(54) DETECTION AND LOCATION OF RADIO FREQUENCY WEAPONS FROM HIGH ALTITUDE GLIDER SYSTEM

(75) Inventors: Alfred E. Pevler, San Antonio, TX (US); Donald R. Van Rheeden, San Antonio, TX (US); Le Moey Wiebush, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 74 days.

(21) Appl. No.: 12/605,439

(22) Filed: Oct. 26, 2009

(65) Prior Publication Data

US 2011/0095933 A1   Apr. 28, 2011

(51) Int. Cl.
*G01S 3/00* (2006.01)

(52) U.S. Cl. ..................................... 342/13; 342/357.39

(58) Field of Classification Search .................... 342/13, 342/357.39
See application file for complete search history.

(56) References Cited

U.S. PATENT DOCUMENTS

| 5,856,803 A | 1/1999 | Pevler |
| 2002/0097184 A1* | 7/2002 | Mayersak ..................... 342/458 |

* cited by examiner

*Primary Examiner* — Thomas H Tarcza
*Assistant Examiner* — Timothy A Brainard
(74) *Attorney, Agent, or Firm* — Ann C. Livingston

(57) ABSTRACT

A method and system for detecting and locating RF weapons being used against aircraft. Large geographic regions may be defended by equipping a constellation of high-altitude airborne platforms with RF detectors, GPS receivers and a communications unit. The communications unit downlinks data indicating an RF weapon pulse and associated time and location data. From this data, a ground station performs a time difference of arrival (TDOA) location fix of the RF weapon.

10 Claims, 4 Drawing Sheets

US 7,948,426 B2

DETECTION AND LOCATION OF RADIO FREQUENCY WEAPONS FROM HIGH ALTITUDE GLIDER SYSTEM

TECHNICAL FIELD OF THE INVENTION

This invention relates to countermeasures for radio frequency weapons, and more particularly to an airborne system that detects and locates such weapons when directed at aircraft.

BACKGROUND OF THE INVENTION

Radio frequency (RF) weapons, also known as directed-energy weapons, use electromagnetic energy on specific frequencies to disable electronic systems. High-power microwave (HPM) weapons are a particularly fearsome type of RF weapon. RF, especially HPM, weaponry can generate destructive electromagnetic waves of such voltage and intensity to disrupt various electronic systems, including systems such as those used to control aircraft and other vehicles, communications systems, and other vital systems.

Most approaches to detection of RF weapons are directed to detection of their emissions. RF weapons are designed to produce the maximum amount of power possible, and to concentrate the power into the shortest possible pulse. In the absence of information of when a pulse will occur or what the frequency it will be, detection is difficult. Thus, an effective detector must respond to short pulses individually. Although the pulse width is likely to be short, the time between pulses can be expected to be long. Furthermore, one pulse may differ significantly from the next pulse.

U.S. Pat. No. 5,856,803, entitled "Method and Apparatus for Detecting Radio-Frequency Weapon Use", to A. E. Pevler, describes technology for detecting RF weapons across a broad spectrum from a single emitted pulse. Received signals are analyzed to discriminate between RF weapon emissions and false-alarm rejection of other electromagnetic signals in the environment. When an intercepted signal meets criteria indicative of an RF weapon, an alarm signal is generated as the system's output.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The invention described herein uses an RF weapon detector, such as that described in the Pevler patent referenced in the Background. The detector's output is input to a geolocation system to locate the point of origin of an RF weapon emission. Large geographic regions may be defended by deploying multiple detectors on a constellation of high-altitude aircraft that are in orbit over the defended region.

The deployment of the detectors on independent platforms allows precise application of time-difference-of arrival (TDOA) analysis of the signals of interest. The result of this analysis from the dispersed detectors is a geolocation position fix, instead of a line of bearing. A line of bearing, by definition, has no range information. Obtaining a geolocation fix on an RF weapon emitter is valuable because appropriate personnel may then be dispatched to a specific location to deal with the emitter.

Figure 1:
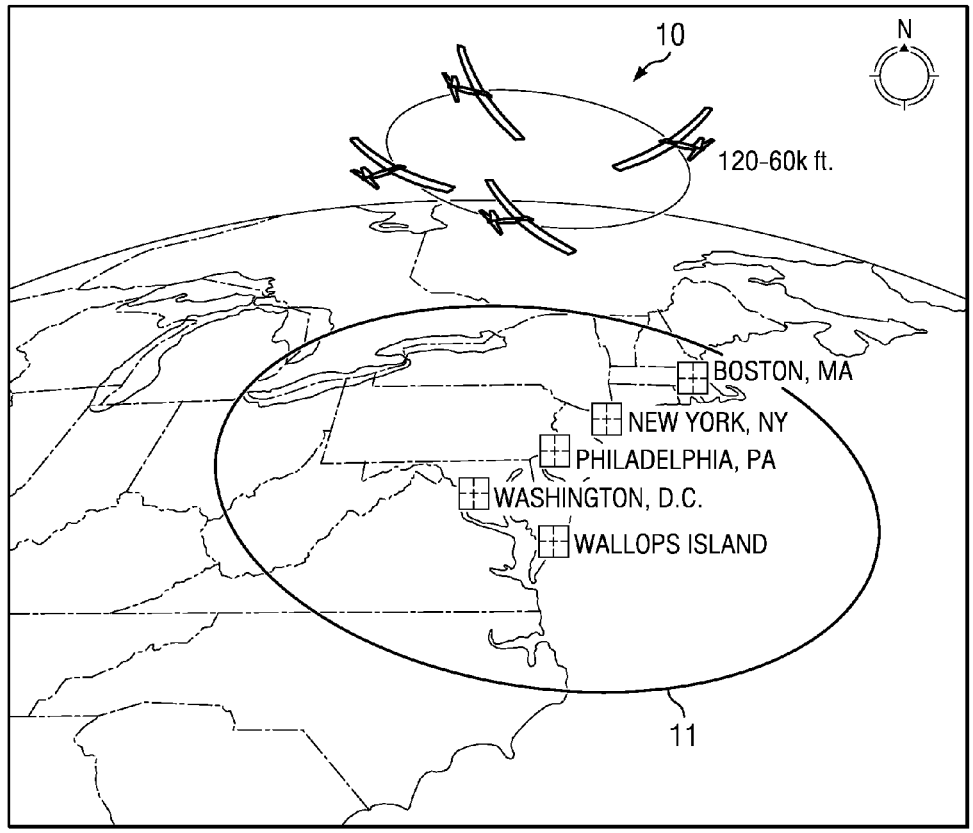
FIG. 1 illustrates a constellation of orbiting airborne platforms on which RF weapon detection units are mounted, as well as an approximation of an area of defended coverage.

FIG. 1 illustrates a constellation of orbiting airborne platforms 10 on which RF weapon detection units are mounted in accordance with the invention. FIG. 1 further illustrates an approximation of an area of defended coverage 11. In the example of FIG. 1, the system is in use for protecting commercial and private aircraft. An example of a typical defended region 10 might be several hundred square miles.

One feature of the airborne platforms 10 is that they are maintained at a height above the altitudes used by commercial and private aircraft. Their ascent is brief and they are launched from areas outside normal air traffic lanes. When their altitude drops to a predetermined minimum, they fly above a landing site and quickly descend from aviation altitudes for landing. An effect of this strategy is that the platforms 10 do not substantially affect air traffic control during their launch and descent, and are above control altitudes while orbiting. An example of a typical altitude is several thousand feet.

Figure 2:
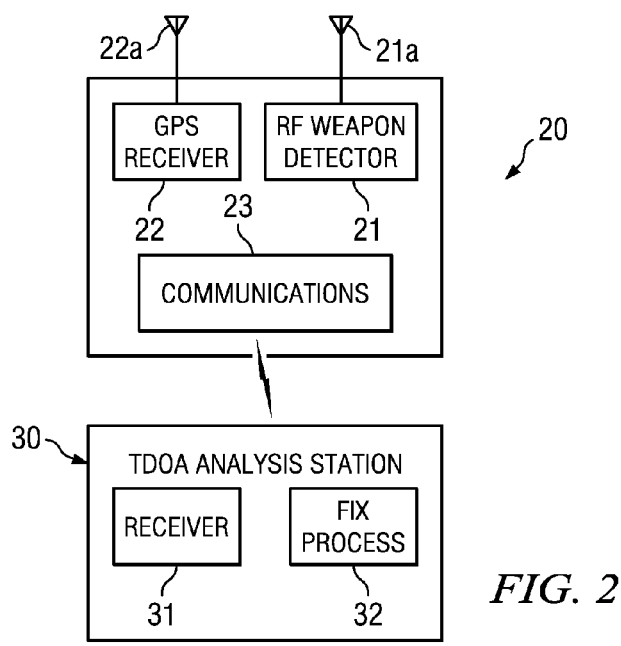
FIG. 2 illustrates the RF detection unit mounted aboard each of the small airborne platforms.

FIG. 2 illustrates the RF detection unit 20 mounted aboard each of the small airborne platforms 10. Each unit 20 has an autonomous RF weapon detector 21. An example of a suitable detector 21 is described in U.S. Pat. No. 5,856,803 "Method and Apparatus for Detecting Radio Frequency Weapon Use", referenced above and incorporated by reference herein.

In addition to the detector 21, each platform also has a global positioning satellite (GPS) receiver 22 for receiving GPS time and location data. A communications unit 23 provides wireless downlink communications to a ground-based TDOA analysis station 30. The detection data and the corresponding GPS data are both included in the communication downlink. The communications unit 23 of each platform 10 may be programmed to find a peak energy time of a detected RF weapon pulse, so that a precise and uniform time stamp may be associated with the pulse received by each platform.

Miniaturizing the detection unit 20 so that it can be deployed on a glider is important to the overall system concept. Deployment of the detection unit 20 exposes it to harsh environmental conditions such as the low pressure environment of flight altitudes. As FIG. 2 shows, only the antenna 21a and 22a of the detection unit 20 is exposed to these environmental challenges, with the rest of the detection unit 20 remaining inside the pressure bulkhead of the flight platform where it can be shielded from environmental and hostile RF conditions.

Referring to both FIGS. 1 and 2, the overall system is comprised of three subsystems: a high-altitude autonomous set of four or more aircraft 10, which can provide a persistent constellation; a detection/location unit 20 aboard each aircraft, which can discriminate an RF weapon emission from other signals in the electromagnetic environment and transmit an alert with GPS information; and a TDOA analysis station 30, which provides geolocation coordinates of the emitter.

The data output from the distributed detectors 24, including GPS data time-tagging the instant that the individual detectors identify an emission as hostile, is delivered to the TDOA analysis station 30. The TDOA analysis station 30 has a receiver 31 that collects the data transmitted from the airborne detection/location units 20.

As explained below, at the TDOA analysis station 30, the data are analyzed to determine the point of origin of the RF weapon generating the intercepted signal. As explained below, station 30 has appropriate processing hardware and software to use the collected data to generate corresponding hyperbolas, the intersection of which indicates the approximate location of the emitter. A fix process 32 uses the received data to provide a display output graphically locating the RF weapon transmitter.

In the example of this description, the high-altitude constellation of aircraft is comprised of high altitude gliders 10 that are launched using helium balloons. Each glider 10 is launched independently and ascends vertically with the balloon. When it reaches the desired altitude, the balloon is released and the glider flies a pre-programmed orbital track around the region of interest. The glider will gradually descend while it is part of the TDOA network. When a glider's altitude diminishes such that it may become an obstacle to air traffic, the glider will automatically fly to an uncongested airspace and execute a preprogrammed landing. When each glider 10 is nearing an altitude at which it will depart the orbital track, another glider will be launched to replace it. After the gliders land at their prescribed location, they will be recovered and reused.

Because air traffic patterns are well known, the deployed platforms 10 can transition from the ground to operational altitudes both quickly and in areas minimizing the probability of air traffic, thereby reducing risk to the platforms 10 and the protected aircraft. By keeping the size and weight of the detection unit 20 and the glider 10 within experimental aviation limits, even if there is a collision, the glider will be sacrificed but the protected aircraft will not be damaged.

In other embodiments, other airborne platforms could be used. The platforms could be powered or unpowered, with common characteristics being that they are capable of supporting the payload necessary for the detection unit 20 and capable of maintaining a high altitude orbit over a designated region to be protected.

Figure 3:
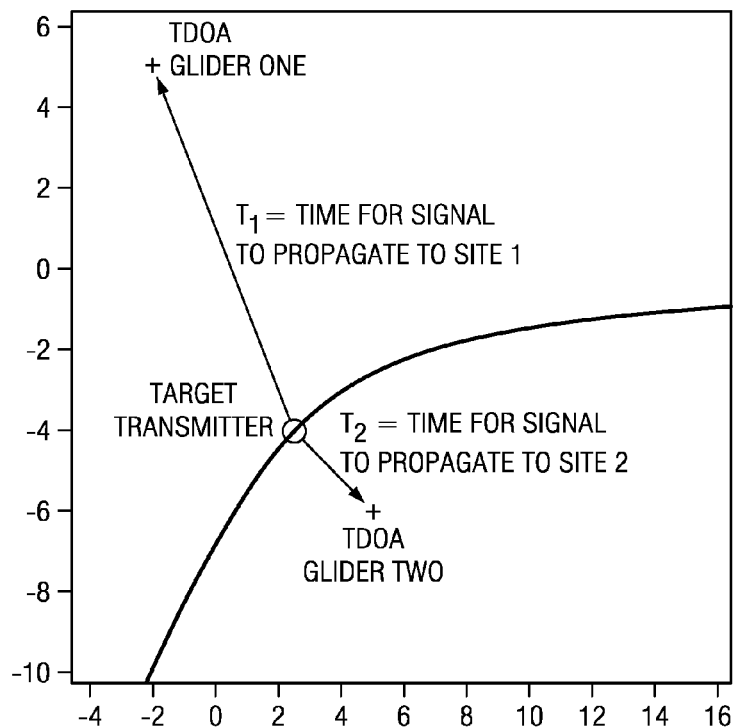
FIG. 3 illustrates a portion of the TDOA analysis for two receivers and a target emitter.

FIG. 3 illustrates a portion of the TDOA analysis for two receivers and a target emitter. To simplify discussion, it is assumed that the emitter and detectors are on the same plane. It should be understood, however, that for the airline security application described herein, the detectors are at altitudes as high as 50,000 feet and the emitter is likely to be on the ground. This altitude, as well as the ground topography, is considered in determining the location of the emitter.

Therefore, in addition to the two-dimensional aspects of geolocation, the location processes will have additional steps of integrating the two-dimensional TDOA results with known geological features of the initial fix. For greater accuracy, at least four airborne detectors are used.

As is known, a time difference of arrival (TDOA) process exploits the propagation time differences of signals received at different receive stations from the same transmitter. The transmitted signal takes T1 seconds to propagate to Receiver 1 and T2 seconds to propagate to Receiver 2. When time-stamped received signal samples are cross-correlated, a resultant peak in the cross-correlation results corresponds to the time difference of arrival, $T\Delta = T1 - T2$. This $T\Delta$ defines a hyperbola, along which the target transmitter can be expected to be located. This hyperbola may be referred to as a "hyperbolic line of position". For geolocation of a target transmitter, three or more receivers must receive the signal.

Figure 4:
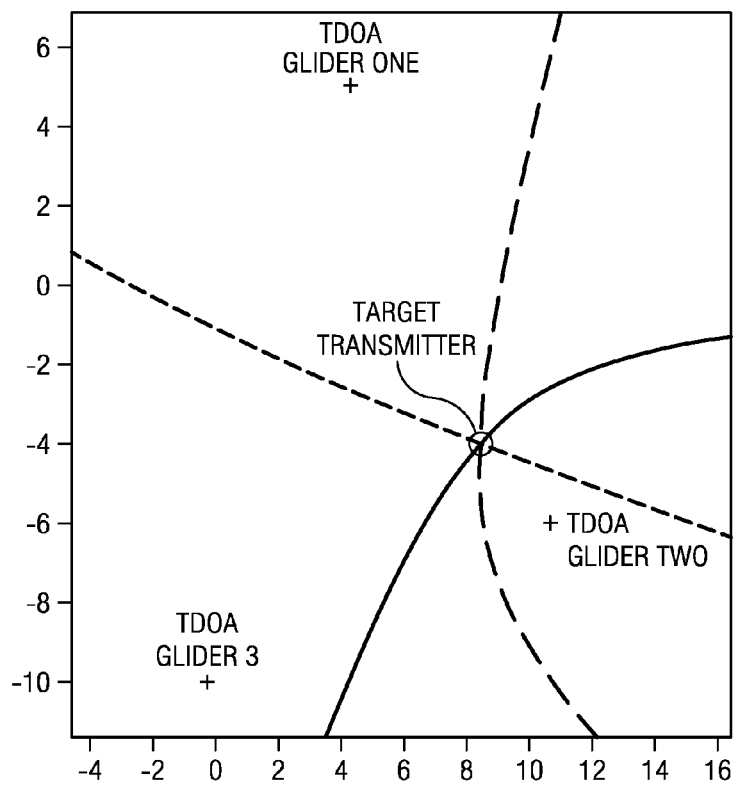
FIG. 4 illustrates the hyperbolic lines of position formed by pairing three receivers.

FIG. 4 illustrates the hyperbolic lines of position formed by pairing three receivers. Receivers 1 and 2 form Hyperbola A, Receivers 1 and 3 form Hyperbola B, and Receivers 2 and 3 form Hyperbola C.

Figure 5:
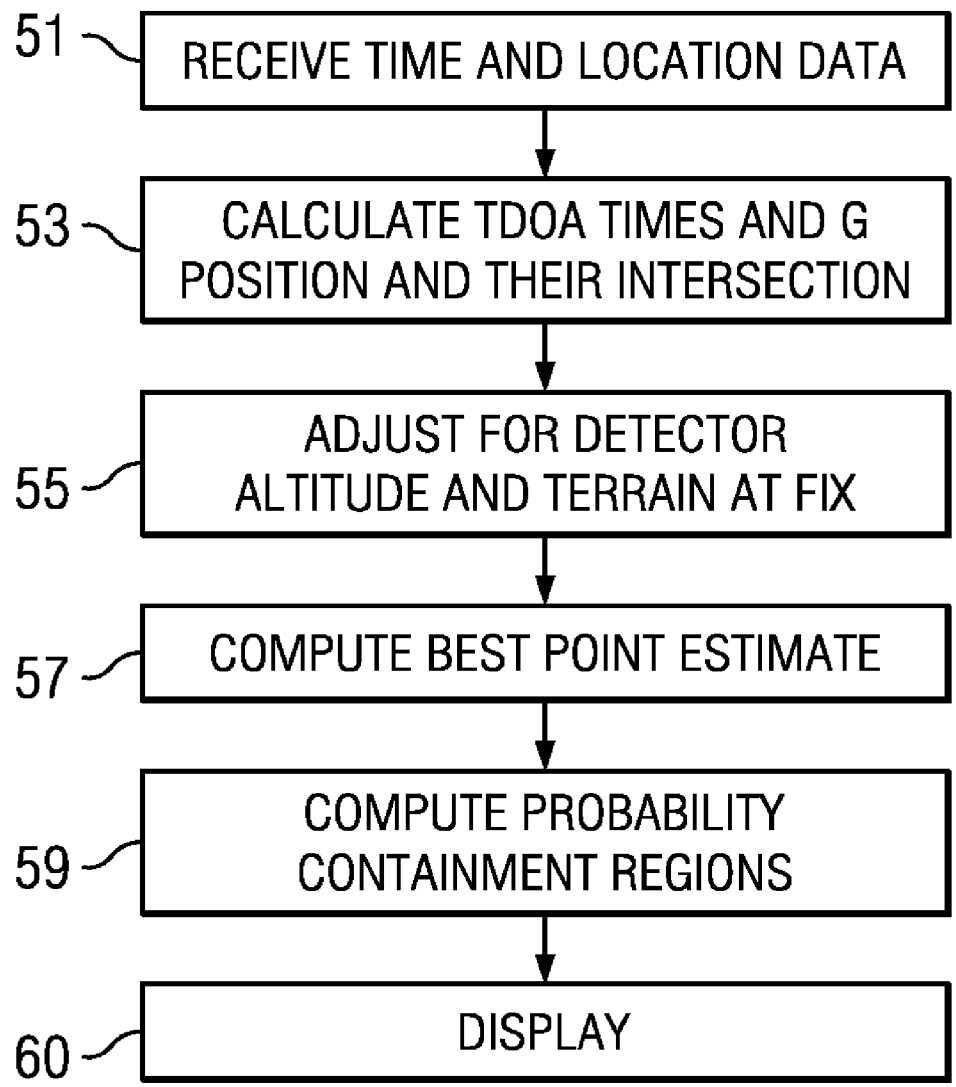
FIG. 5 illustrates the TDOA fix process performed by the TDOA analysis station.

FIG. 5 illustrates the TDOA fix process performed by TDOA analysis station 30. Step 51 is receiving time and location data associated with a RF weapon pulse, as detected by each airborne platform 10. Step 53 is calculating the hyperbolic lines of position and their intersection. Step 55 is adjusting the intersection data with altitude and terrain data to compensate for the difference in altitude between the platforms and the emitter.

Step 57 is calculating a best point estimate of the target transmitter's longitude and latitude. Receiver equipment and multi-path propagation conditions are likely to result in noisy measurements and measurement bias. As a result, it is common for the hyperbolic lines to not actually intersect. In practice, the fix process finds an optimum location, that is, the location that minimizes mass error between the hyperbolas. The fix process also tests for consistency of the hyperbola measurements. For a system having four or more receives, the fix process rejects hyperbolas that have severe biases outside the expected measurement norm.

In Step 59, the fix process computes a probability containment region around the best point estimate. This region defines an area where there is defined probability (e.g., 90%) of physically finding the RF weapon. The statistical performance of time of arrival measurements for each platform 10 is used to compute this region. For example, if a particular platform 10 has had inconsistent or unreliable data, its data may be discounted.

The probability containment region is expressed as an ellipse, as well as a circle. The ellipse is the optimal shape for the containment area. The circle is specified by a circular error radius centered on the best point estimate.

Figure 6:
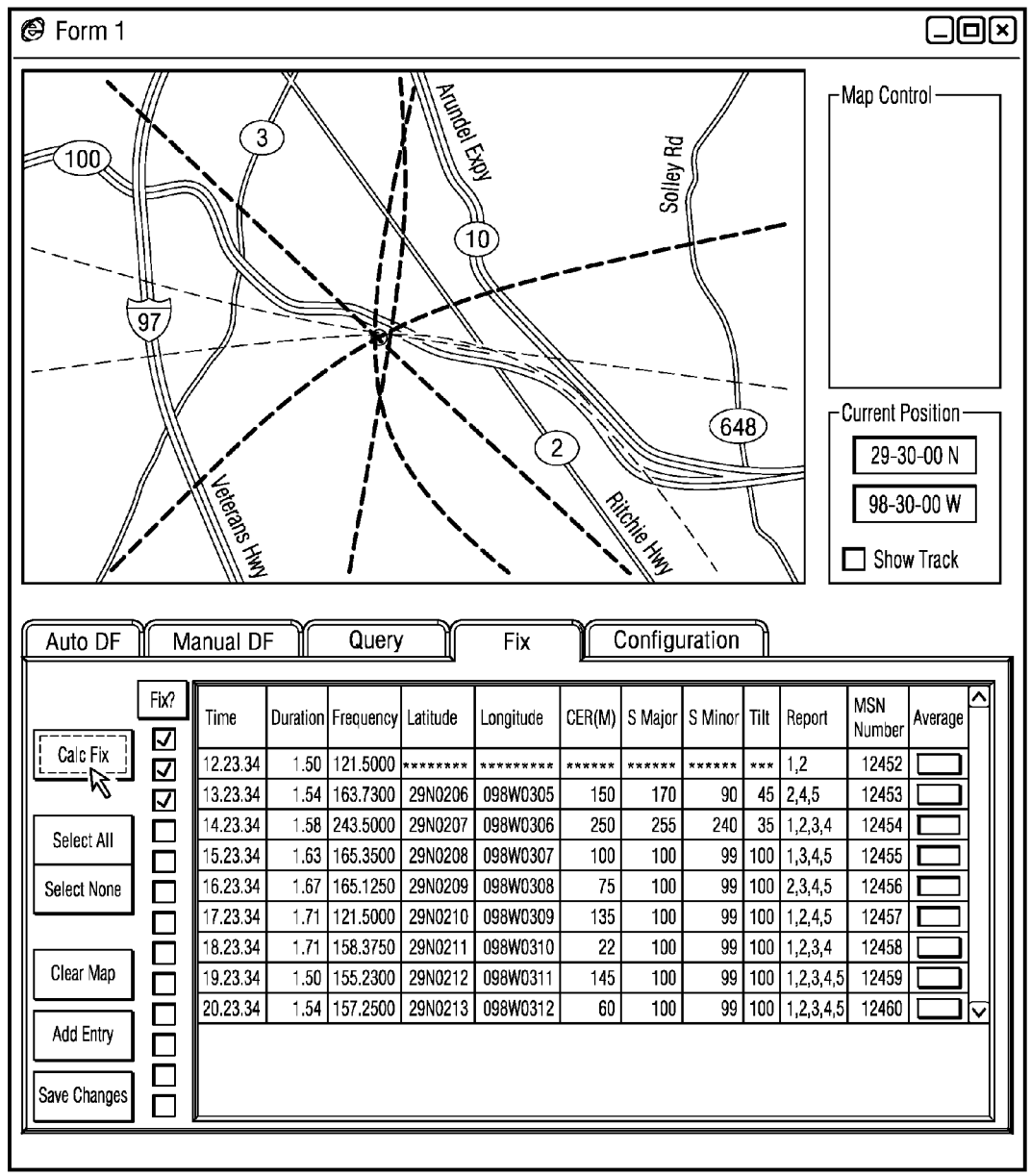
FIG. 6 illustrates a graphical display 60 provided by the TDOA analysis station.

FIG. 6 illustrates a graphical display 60 provided by the TDOA station 30. The hyperbolic lines are superimposed on a map. The containment region may be displayed as the above-described circle or ellipse, or both. A chart displays characteristics of the detected pulse, such as its time, duration, and frequency. The latitude and longitude of the best point estimate, as well as the dimensions of the circular and elliptical containment regions are also displayed.

In sum, the detection and location system provides the capability to detect and locate radio frequency weapons over a large geographic region. The detection data provides invaluable guidance to organizations wanting to interdict hostile attacks.

What is claimed is:

1. A method of detecting and locating RF emissions weapons, comprising:
   selecting a geographic region of protection;
   deploying at least four aircraft to an altitude above commercial airline flight traffic lanes, each aircraft carrying a detection unit having at least an RF weapon detector, a GPS receiver, and a communications unit;
   wherein the detection unit is programmed to time stamp detected RF weapon pulses and to associate GPS location data with the time of detection;
   wherein the aircraft are configured to orbit above the geographic region;
   monitoring data received from each aircraft at a ground station, the data from each aircraft indicating if an RF weapon pulse has been detected, and if so, the data further indicating the time of such detection and the location of the aircraft at that time;

using a computer-based analysis unit at the ground station to perform the following steps: to calculate hyperbolic lines of position associated with the data from each aircraft; to use the results of the preceding step and additional data representing the altitude of the aircraft and the terrain of the geographic region to calculate a best point estimate of the location of the RF weapon; to calculate at least one probability containment region around the best point estimate; and to display a map of at least part of the geographic region, the map graphically illustrating the containment region and the best point estimate.

2. The method of claim 1, wherein the aircraft are gliders.

3. The method of claim 2, wherein the deploying step is performed by using lighter-than-air balloons to lift the gliders to the desired altitude.

4. The method of claim 1, wherein the containment region is circular.

5. The method of claim 1, wherein the containment region is an ellipse.

6. A system for detecting and locating RF emissions weapons within a geographic region of protection, comprising:

at least four aircraft configured to orbit above the geographic region at an altitude above commercial airline flight traffic lanes, each aircraft carrying a detection unit having at least an RF weapon detector, a GPS receiver, and a communications unit;

wherein the detection unit is programmed, to time stamp detected RF weapon pulses, to associate GPS location data with the time of detection, and to transmit data representing the time of the pulse and the associated location via a downlink channel;

a ground station having computer-based equipment programmed to perform the following; to monitor the downlink channel for data received from each aircraft at a ground station, the data from each aircraft indicating if an RF weapon pulse has been detected, and if so, the data further indicating the time of such detection and the location of the aircraft at that time; to calculate hyperbolic lines of position associated with the data from each aircraft; to use the results of the preceding step and additional data representing the altitude of the aircraft and the terrain of the geographic region to calculate a best point estimate of the location of the RF weapon; to calculate at least one probability containment region around the best point estimate; and to display a map of at least part of the geographic region, the map graphically illustrating the containment region and the best point estimate.

7. The system of claim 6, wherein the aircraft are gliders.

8. The system of claim 7, wherein lighter-than-air balloons are used to lift the gliders to the desired altitude.

9. The system of claim 6, wherein the containment region is circular.

10. The system of claim 6, wherein the containment region is an ellipse.

* * * * *